(12) United States Patent
Omps

(10) Patent No.: US 7,163,181 B2
(45) Date of Patent: Jan. 16, 2007

(54) MAGNETIC MOUNTING ASSEMBLY

(76) Inventor: Justin T. Omps, 600 Water St., NBU 2-14, Washington, DC (US) 20024

( * ) Notice: Subject to any disclaimer, the term of this patent is extended or adjusted under 35 U.S.C. 154(b) by 320 days.

(21) Appl. No.: 10/321,511

(22) Filed: Dec. 18, 2002

(65) Prior Publication Data
US 2004/0118985 A1 Jun. 24, 2004

(51) Int. Cl.
*F16M 11/02* (2006.01)
*A47G 5/00* (2006.01)

(52) U.S. Cl. .............................. 248/181.1; 248/288.31; 248/288.51; 403/56; 403/76; 403/90; 403/122; 403/DIG. 1

(58) Field of Classification Search ............. 248/181.1, 248/181.2, 182.1, 187.1, 288.31, 288.51; 396/198, 544; 403/56 X, 76 X, 90 X, 122–144, 403/122 X, DIG. 1 X
See application file for complete search history.

(56) References Cited

U.S. PATENT DOCUMENTS

| 318,480 | A | | 5/1885 | Kendrick |
|---|---|---|---|---|
| 3,286,212 | A | | 11/1966 | Thompson et al. |
| 3,424,419 | A | * | 1/1969 | Siegel ................... 248/231.71 |
| 3,908,945 | A | * | 9/1975 | Shapiro et al. ............. 248/165 |
| 4,719,549 | A | | 1/1988 | Apel |
| 4,740,804 | A | * | 4/1988 | Shands ....................... 354/126 |
| 4,974,802 | A | * | 12/1990 | Hendren ...................... 248/181 |
| 5,772,164 | A | | 6/1998 | Shen |
| 5,790,910 | A | | 8/1998 | Haskin |
| 6,209,830 | B1 | | 4/2001 | Brotz |
| 6,254,044 | B1 | * | 7/2001 | Lee .......................... 248/177.1 |
| 6,350,076 | B1 | | 2/2002 | Wagner et al. |
| 6,352,228 | B1 | | 3/2002 | Buerklin |
| 6,439,518 | B1 | | 8/2002 | Brotz et al. |
| 2002/0096956 | A1 | | 7/2002 | Erten |

FOREIGN PATENT DOCUMENTS

FR          2660589 A1 *    4/1990

OTHER PUBLICATIONS

Calumet Photo.com, Cambo CBH-5 Ball Head (Nov. 4, 2002).
Calumet Photo.com, Bogen Magnesium Center G1377M Ball Head (Nov. 4, 2002).
Calumet Photo.com, Manfrotto Medium Ball Head.
Calumet Photo.com, Novoflex MagicBall Head.

* cited by examiner

*Primary Examiner*—Gwendolyn Baxter
(74) *Attorney, Agent, or Firm*—Joan K. Lawrence

(57) ABSTRACT

A magnetic mounting assembly for securely attaching a positionable object to be variably fixed in a desired selected position to a support, for universally moving the positionable object to the desired selected position, and for holding the positionable object in that position during operation is provided, including a positioning element with a ball that is attached to the positionable object. A support element includes a socket configured to movably engage the ball. One of either the ball or socket includes a magnetic material and the other includes a magnetically attractive material to hold the ball in the socket by magnetic as well as frictional forces. An adjustment collar controls the axial movement of the ball to increase or decrease the magnetic force holding the ball in the socket. This mounting assembly is particularly useful for supporting a camera on a tripod.

15 Claims, 4 Drawing Sheets

MAGNETIC MOUNTING ASSEMBLY

TECHNICAL FIELD

The present invention relates generally to mounting structure intended to movably mount and position a positionable object on a support and specifically to a magnetic mounting assembly designed to support and universally position a wide range of sizes and weights of positionable objects, including cameras or like devices on tripods or other supporting structure.

BACKGROUND OF THE INVENTION

Mounting an object that is required to be positioned and fixed in a potentially infinite number of locations on a support in a manner that provides stable and secure attachment while allowing universal positioning of the mounted device has long been a challenge. Over the years the prior art has proposed a number of solutions to this problem, particularly with respect to the positioning of cameras on tripods or other supports. U.S. Pat. No. 318,480 to Kendrick, for example, discloses a joint structure between a camera and tripod that enables the camera to be universally adjusted on the tripod without adjusting the tripod. The joint described in this patent includes a semispherical cup or depression that supports a ball clamped in the cup. Bearing strips located in grooves in the cup provide a secure fit while avoiding expensive turning or finishing work. A thumbscrew holds the ball in the cup once the camera has been moved to a desired position. If it is desired to move the camera to another position, the thumbscrew must be loosened, the camera positioned in the new position, and the thumbscrew retightened. This process must be repeated each time the position of the camera is changed.

A mounting apparatus for a security or surveillance camera is described in U.S. Pat. No. 5,790,910 to Haskin. This mounting apparatus, which includes a ball and socket type of connection between the camera and the support in a swivel assembly, permits adjustment of the horizontal (pan) and vertical (tilt) position of the camera. A locking screw, which secures the camera in the desired position, must be disengaged and reengaged to change the camera's position. The ball does not freely rotate in the socket unless the locking screw is disengaged; however, the locking screw must be engaged to hold the ball in the socket so the camera can maintain the desired position. This arrangement would be likely to be limited to use with relatively light weight cameras.

Symmetrical half shells define a socket in a tripod head in U.S. Pat. No. 5,772,164 to Shen. This socket supports a ball on a camera mounting platform, and a lock screw, hexagon nut and cap nut assembly are required to adjust the spacing between the half shells, so that the ball can be moved to position the camera. This multiple component structure requires unnecessarily complicated maneuvers to move the ball so the camera is fixed in the desired position and then to insure that the camera is held in this position.

U.S. Pat. No. 6,209,830 to Brotz and U.S. Pat. No. 6,439,518 to Brotz et al disclose apparatus for mounting a camera on a tripod platform wherein a pear-shaped ball attached to the camera is inserted into a substantially cylindrical cradle cup attached to a tripod so that the camera can be rapidly mounted on or removed from the tripod. An O ring positioned in a groove in the cradle cup holds the ball in the cup. The static friction between the ball and the cup is stated to be sufficient to hold the camera in any set position, yet the sliding friction is low enough to allow easy movement of the camera to other desired positions. The nonspherical shape of the ball, however, limits the range of positions in which the camera can ultimately be fixed, and the effective frictional forces will be reduced as the components of this apparatus, particularly the O ring, are subject to wear.

A tripod head with a universal joint is described in U.S. Pat. No. 6,352,228 to Buerklin. A metal ball joint mounted in a bearing housing is releasably connectable to an axial element rotatably mounted outside and adjacent to the ball joint housing. The axial element includes a friction element, preferably made of rubber, to connect the axial element to the ball joint. The bearing housing does not conform to the configuration of the ball joint, but supports the ball by ring bearings. A clamping ring in the bearing housing is set or released to fix the ball joint in a desired position. Since the bearing housing does not support the ball in a receptacle having a corresponding radius of curvature, the range of movement of the ball, and thus the camera, is limited by this structure.

A magnetic camera support is described and shown in U.S. Pat. No. 3,286,212 to Thompson. A first part of the magnetic support is secured to a camera and a second part of the magnetic support is secured to a camera tripod. The parts are shaped to be interfitted with one another and are constructed of material with magnetic properties so that when the camera is secured to the tripod relative movement between them does not occur. A plurality of fasteners is required to hold the parts of the magnetic support together. Although this arrangement provides a secure and stable support for the camera, it does not permit universal movement of the camera relative to the support.

Ball and socket types of connectors incorporating magnets and used for diverse purposes are known. U.S. Pat. No. 4,719,549 to Apel, for example, shows a ball and socket connector useful for an illumination system. This connector incorporates a commercially available ball and socket joint including a magnetic holder with a hemispherical recess for receiving a ball made of a magnetic material. Since these magnetic joints must be configured to establish electrical contact, they must be conductive. The arrangement described by Apel would not be useful for positioning and holding in place a heavy object. Moreover, the magnetic ball could not be used with digital cameras or other devices that are magnetically sensitive. Likewise, the magnet-containing ball and socket joint disclosed in U.S. Pat. No. 6,350,076 to Wagner et al, which is part of an apparatus that holds surgical instruments, would not be an effective positioning and support structure for large or heavy positionable objects. The arrangement of the magnetic element relative to the ball and socket in this patent requires an actuation element to produce the axial displacement of arms attached to the ball and socket components of the system described. Such an arrangement may have a useful positioning function; however, it does not suggest how it could concurrently support and universally position a positionable object.

The prior art, therefore, fails to provide a simple magnetic mounting assembly that securely and stably supports and rapidly universally positions a wide range of sizes and weights of positionable objects on supports that employs a combination of magnetic and frictional forces to permit the positionable device to be easily attached to the support so that the positionable object may be easily moved and rapidly variably fixed in a selected one of an infinite range of positions relative to the support without locking devices or actuating mechanisms.

SUMMARY OF THE INVENTION

It is a primary object of the present invention, therefore, to overcome the disadvantages of the prior art and to provide a simple magnetic mounting assembly that will securely hold a positionable object on a support structure while allowing the object to be universally positioned and variably fixed rapidly and easily in a selected one of an infinite range of positions without the need for locking devices or actuating mechanisms.

It is another object of the present invention to provide a magnetic ball and socket mounting assembly for mounting a positionable object on a support that permits rapid, easy positioning of the object so that it is held in a desired selected position without a requiring a locking mechanism.

It is a further object of the present invention to provide a magnetic ball and socket mounting assembly for mounting a camera on a tripod that adjustably universally positions the camera to a desired position and securely holds the camera in the desired position.

It is still another object of the present invention to provide a single simple magnetic ball and socket mounting assembly capable of universally positioning, holding in place and supporting on supports positionable objects of a wide range of sizes and weights.

It is still another object of the present invention to provide a magnetic ball and socket mounting assembly capable of rapidly universally positioning and securely holding and supporting positionable devices that is smooth and quiet in operation.

It is a still further object of the present invention to provide a magnetic ball and socket mounting assembly capable of universally positioning and supporting magnetically sensitive positionable objects.

It is yet a further object of the present invention to provide a magnetic ball and socket mounting assembly that may use a permanent magnet, an electromagnet, or a combination of magnets to position and hold positionable objects.

It is yet another object of the present invention to provide a magnetic ball and socket mounting assembly useful for mounting and positioning firearms, telescopes, optical instruments and the like.

It yet another object of the present invention to provide a magnetic ball and socket mounting assembly capable of positioning and supporting heavy positionable objects in industrial applications.

In accordance with the aforesaid objects, the present invention provides a simple magnetic mounting assembly capable of securely and stably attaching a positionable object which may be rapidly variably fixed in a desired selected position to a support. The mounting assembly includes a positioning element attached to the device to be supported with ball means to universally vary the position of the device and a support element, in supporting contact with the support, with socket means configured to receive and hold the ball means in secure contact so that the device may be variably fixed in the desired selected position. One of either the ball means or the socket means includes a magnetic material and the other includes a magnetically attractive material. The magnetic material and the magnetically attractive material are selected to achieve optimum balance between, the frictional and magnetic forces required to fix and hold the positionable object in the desired selected position. Adjustable collar means is provided to move the ball means axially into and out of holding contact with the socket means. In a preferred embodiment the socket means includes a magnetic material and the ball means includes a magnetically attractive material. The ball means may be formed of a nonmagnetic material that contains a magnetically attractive material. The magnetic material may be a permanent magnet, an electromagnet, or a combination of permanent and electromagnets.

Further objects and advantages will be apparent from the following description, drawings and claims.

DESCRIPTION OF THE INVENTION

Conventional mechanisms for supporting, holding and positioning positionable objects have frequently involved complex rather than simple construction and have not always functioned to concurrently support and position the positionable object as effectively as might be desired. Once the supported positionable object is positioned, moreover, the holding function of these mechanisms often requires extensive adjustment and does not always insure that the the positionable object will be held securely in place in the desired position. The mounting assembly of the present invention presents a simple structure that efficiently and effectively provides a secure and stable attachment between a support and a positionable object to be variably fixed in one of a desired range of infinite positions and held in the desired selected position on the support. The mounting assembly of the present invention employs frictional and magnetic forces to effect smooth rapid movement of the supported positionable object to the desired position and superior holding power and stability to maintain the positionable object in this position without extraneous locking devices.

Figure 1:
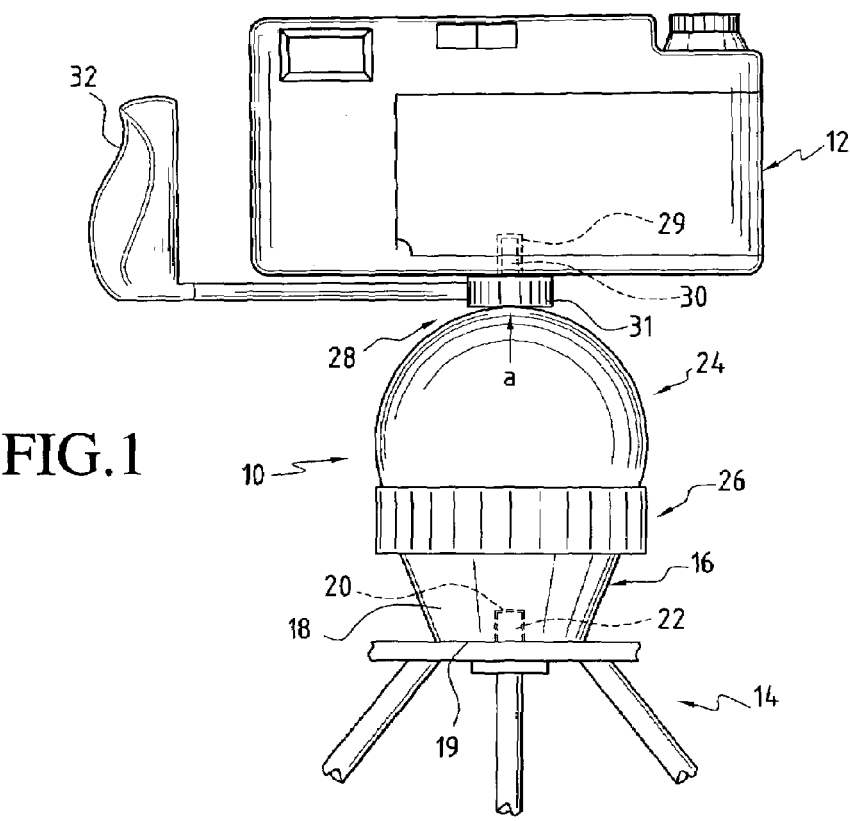
FIG. 1 is a side view of a mounting assembly in accordance with the present invention in a first selected position.

Referring to the drawings, FIG. 1 illustrates a side view of a mounting assembly 10 constructed according to the present invention. The mounting assembly 10 is shown attaching a camera 12 to a tripod 14. Although the present assembly is especially well suited for this purpose, other positionable objects to be supported and positioned in a variable range of positions, including, but not limited to, firearms, telescopes, optical instruments, industrial machinery, surgical devices, and robotic arms, could also be supported and positioned by the mounting assembly 10 as described herein. Moreover, the mounting assembly 10 of the present invention can be effectively employed to secure any type of positionable object to any type of support, provided that the positionable object or the support can be adapted for attachment to the mounting assembly as will be explained below.

To achieve a secure yet positionable attachment between the camera 12 and the tripod 14, the mounting assembly 10 is constructed with a ball and socket type of configuration. The ball and socket structure of the present invention provides a strong, stable connection between the positionable object and its support and permits the positionable object to be moved universally to a desired selected position. The socket portion of the mounting assembly is incorporated in a support element 16 that is designed to be removably attached to a support, such as the tripod 14. One common type of attachment is shown in FIG. 1, although many other kinds of attachments are available and may be used. The support element 16 includes a mounting base 18 with a receptacle 20 extending from a support-contacting surface 19 of the support element. Since most kinds of tripods are fitted with a threaded projection, such as shaft 22, the receptacle 20 is preferably threaded so that the support element mounting base 18 can simply be screwed onto the tripod as shown. Other types of connector structures are well known and may also be employed for this purpose. The ball portion of the present mounting assembly 10 is incorporated into a positioning element 24 that is movably held within the support element 16 as will be explained in detail below. An adjusting collar or retaining ring 26 engages the support element 16 to control the axial movement of the positioning element 24 with respect to the support element and to hold the positioning element an optimum distance from the base 18.

A connector structure 28 is provided on a pole a of the spherical positioning element 24 axially opposite the base 18. Most cameras are provided with a threaded receptacle, such as receptacle 29, that is intended to engage a corresponding threaded shaft on the tripod, such as threaded shaft 22. The connector structure 28 includes a threaded shaft 30 attached to a knob 31 that engages the threaded receptacle 29 in the camera 12. Any other suitable connector structure could also be employed to attach the camera to the positioning element 24. The connector structure 28 also includes a handle 32, preferably removably attached to one of two opposite locations on knob 31, that is used to guide the movement and facilitate the positioning of the positioning element 24 and, thus, move the camera to a desired selected position. The handle 32, which is shown to have a contoured configuration, could also be made with any other convenient shape or design.

Figure 2:
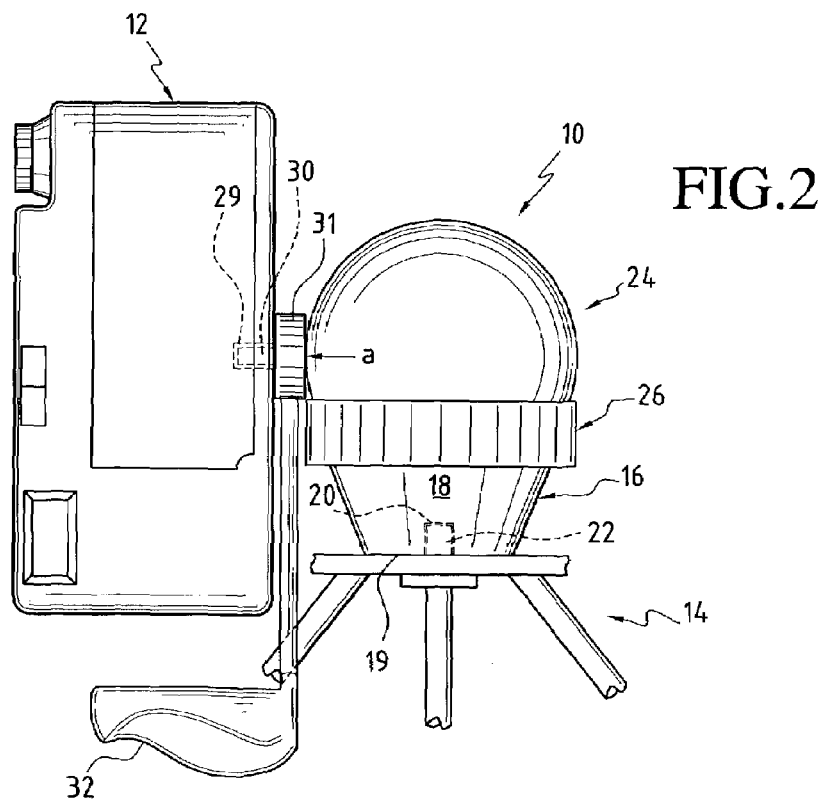
FIG. 2 is a side view of a mounting assembly in accordance with the present invention in a second selected position.

FIG. 2 shows the mounting assembly of FIG. 1 with the camera positioned 90 degrees from the position shown in FIG. 1. The camera or other positionable object will be readily supported and held, even in this maximal position, by the present mounting assembly without a separate locking device, as will be explained in detail below. The positions shown in FIGS. 1 and 2 are only two of an infinitely variable range of positions the positionable object can occupy.

Figure 3:
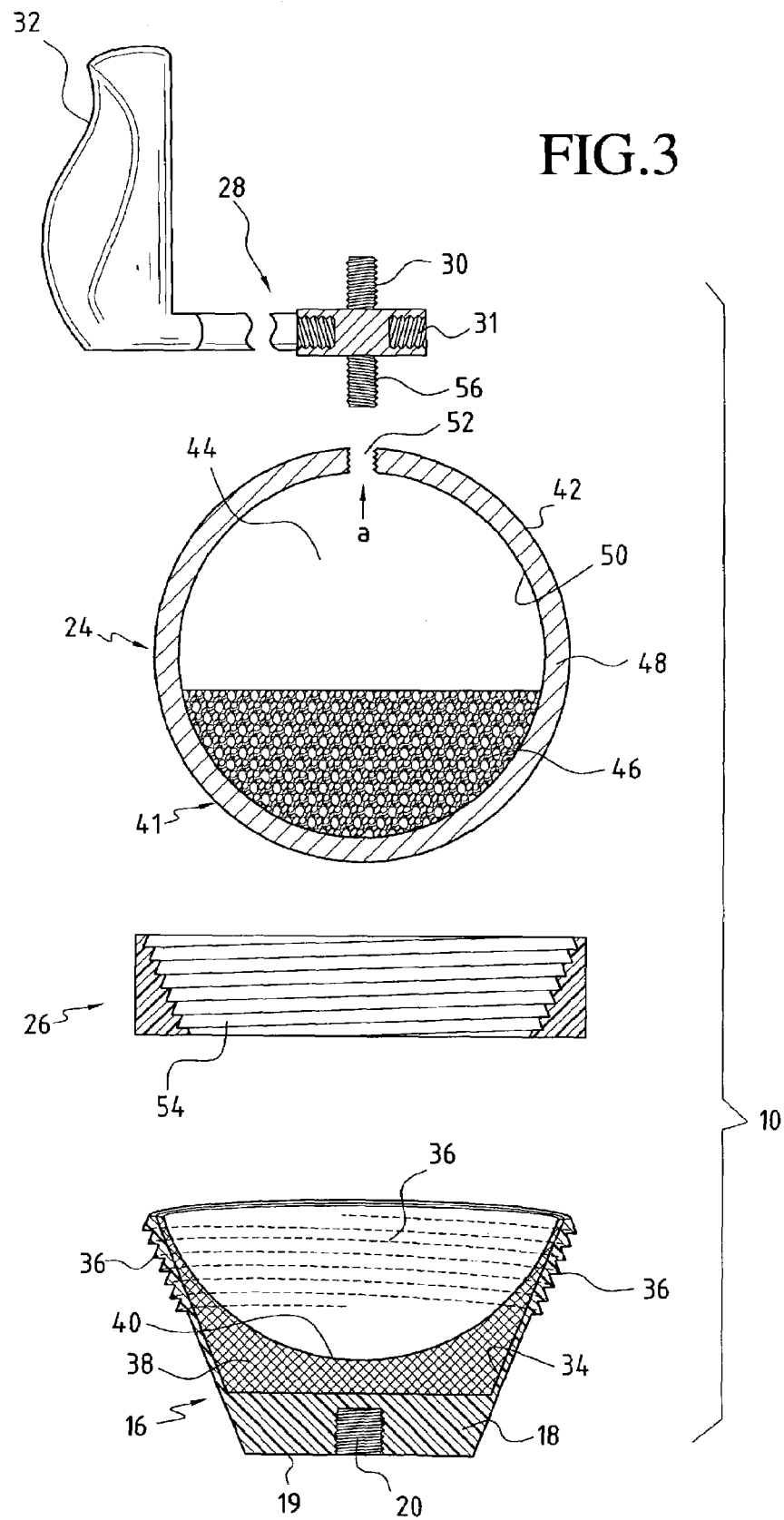
FIG. 3 is an exploded cross-sectional view of one embodiment of a mounting assembly in accordance with the present invention.
Figure 6:
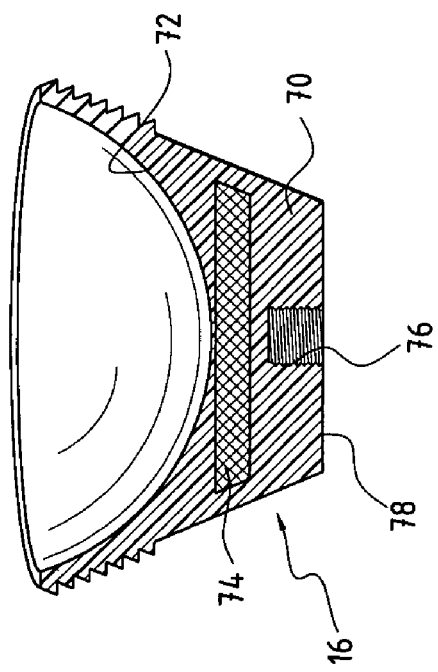
FIG. 6 is a side view of a second embodiment of a socket of the magnetic mounting assembly according to the present invention.

FIG. 3 illustrates the mounting assembly 10 of the present invention in an exploded cross-sectional view, showing in detail the preferred ball and socket configuration of the positioning element 24 and the support element 16. The mounting base 18 of the support element 16 is preferably formed of a hard plastic material, although other suitable materials could also be used, provided they are sufficiently strong and lightweight. The particular application in which the mounting assembly is to be used will determine the choice of materials. The mounting base, which is shown to have the shape of a truncated cone, has at the narrow end a support contacting surface 19 with a threaded receptacle 20 to receive a threaded shaft from a tripod or other support. The opposite wider end of the mounting base 18 is configured to form an interior socket 34, one embodiment of which is shown in FIG. 3. Another embodiment of socket configuration is shown in FIG. 6. The exterior surface of the mounting base 18 adjacent to the interior socket 34 includes a circumferential threaded section 36. Although the preferred configuration of the mounting base is the truncated cone shown in the drawings, the mounting base 18 may also be cylindrical or any other functional configuration. The preferred configuration of the positioning element 24 is the spherical hollow ball 41 shown in FIG. 3. The shape of the socket 34 in the mounting base 18 should therefore be selected to correspond to and have the same radius of curvature as the spherical configuration of the positioning element 24 to provide a secure fit between the ball 41 of the positioning element 24 and the socket 34 in the mounting base 18 of the support element 16.

The structural components of the mounting assembly of the present invention employ magnetic forces enhanced by frictional forces to provide a unique positioning and support structure that stably and securely attaches a positionable object to a support so that the positionable object can be universally positioned and variably fixed in a desired position. As a result, the present invention achieves a secure fit between components and superior positioning and support functions not produced by available ball and socket or magnetic positioning and support structures. This is due to the structure and the arrangement of magnetic, nonmagnetic, and magnetically attractive elements of the present mounting assembly. The support element mounting base 18 includes a magnet 38 located within the socket 34. In the FIG. 3 embodiment the magnet. is formed to have a spherical socket 40 with a radius of curvature corresponding to the radius of curvature of the ball 41 and is sized to produce a snug fit between the exterior surface 42 of the ball 41 and the socket 40 so that the frictional forces between the ball 41 and the socket 40 will assist in maintaining these components in place. The primary force that holds the ball 41 in the socket 40, however, is the force of the magnet 38. The ball 41 directly contacts the magnet 38 in this embodiment.

Many kinds and arrangements of magnets are suitable for holding the ball 41. in contact with the socket 40. The type of magnet selected will depend, in large measure, on the specific application of the magnetic mounting assembly. The magnet optimally should be strong enough to hold the positionable object in the position shown in FIG. 2, which requires maximum holding power. A single permanent magnet having the configuration of magnet 38 or magnet 74 (FIG. 6) can be used. Alternatively, a cluster of smaller permanent magnets can be arranged to approximate the configuration of magnet 38 or magnet 74. Another alternative is to use a layered magnet structure, wherein thin permanent magnets positioned with their poles aligned are alternately layered with steel to form a magnet with the configuration of magnet 38 or 74. Yet another alternative employs an electromagnet to replace magnet 38 or 74. An array of timed electromagnets, for example, could also replace magnet 38 or 74 in industrial or other applications to allow the automatic positioning of the positionable object. U.S. Patent Publication No. US 2002/0096956 A1, the disclosure of which is incorporated herein by reference, describes the use of a plurality of electromagnets spaced about a spherical surface that are positioned and controlled to move the spherical surface relative to another spherical surface. An arrangement of this type could be employed to automatically move the magnetic mounting assembly of the present invention to position a large telescope in an observatory, for example. A combination of permanent magnets and electromagnets could also be used for magnet 38 or magnet 74.

Another consideration in selecting an appropriate magnet for the mounting assembly is the environment in which the mounting assembly is to be used. For example, some industrial applications could require operation of the mounting assembly at very high or low temperatures and/or pressures. A magnet that would withstand the environment is required. If the present mounting assembly is used in satellite positioning devices, for example, a magnet that would function effectively at low temperatures would be needed. The use of the mounting assembly to support and position a camera as shown and described in connection with FIGS. 1 and 2 would occur primarily at ambient temperatures. A high strength rare earth magnet composed of neodymium, iron and boron has been found to function as required for this application. A wide range of other magnetic materials, including, but not limited to, iron nickel and selenium cobalt, will also be suitable for forming magnet 38 in FIG. 3 and magnet 74 in FIG. 6. The field strength of the magnet, which is the inverse of the cube of the distance from the magnet to the magnetically attractive material in the ball 41, will be a factor for consideration in selecting an optimum magnet for the present magnetic mounting assembly.

The hollow ball 41 is formed of a nonmagnetic material and preferably contains a magnetically attractive material 46 in the central space 44 inside the ball. For many applications the ball 41 will have a diameter within the range of about 2 to 5 inches, although industrial applications will require much larger balls and robotic or surgical applications will require smaller balls. A 3 inch diameter ball is preferred for a mounting assembly connecting a camera to a tripod. A preferred nonmagnetic material for ball 41 is stainless steel or plastic. The thickness of the wall 48 between the exterior surface 42 and the interior surface 50 of the hollow ball will depend on the size of the ball and the the application of the mounting assembly. The optimum thickness of the wall 48 will depend on the strength of the magnet 38 and should be proportional to the magnet strength. A stainless steel ball having a wall 48 thickness in the range of 0.005 to 0.012 inches is preferred when the the mounting assembly of the present invention has a 3 inch diameter ball and is used to mount a camera to a tripod.

A magnetically attractive material 46 that is particularly preferred for use inside the ball 41 is a particulate material, such as steel shot, although iron filings and similar magnetically attractive particulates can also be used effectively. The size of the magnetically attractive particles should be selected to allow them to pass through an aperture 52 located in the pole a of ball 41 providing access to the interior of the ball. The magnetically attractive particles should ideally be about $\frac{1}{8}$ inch to $\frac{1}{2}$ inch in diameter, or about $\frac{1}{24}$ to about $\frac{1}{8}$ of the ball 41. The maximum optimal amount of magnetically attractive particles will occupy about half of the volume of the interior of ball 41. To obtain optimum universal movement of the ball 41 in the socket 40, the amount of magnetically attractive particles in the ball should allow the particles to shift as the ball is moved. When the ball 41 contacts the socket 40 formed in the magnet 38, the magnetically attractive particles 46 become magnetized as a result of the force exerted on them by the magnet 38. This effectively lock the ball in the socket. Because of this magnetization, the level of the magnetically attractive particles 46 should be kept in the socket contacting hemisphere of the ball 41 to minimize excessive magnetization of the pole a hemisphere of ball 41. Excessive magnetization of this portion of the ball 41 would prevent use of the present mounting assembly with digital cameras or other instruments sensitive to magnetic forces.

An adjustment collar or retaining ring 26, preferably formed of the same plastic material as the mounting base 18, is provided to increase or decrease the magnetic force exerted on the ball 41 and to engage the ball 41 axially in place in the socket 40 relative to the magnet 38 when the desired force is exerted by the magnet on the ball. The interior of the adjustment collar 26 is threaded at 54 to correspond to the threaded portion 36 on the exterior surface of the mounting base 18. The ball 41 should be positioned close to the magnet 38 when a heavy positionable object is mounted on the mounting assembly to insure that maximum magnetic force is exerted on the magnetically attractive particles 46 in ball 41. A lighter positionable object does not required the same degree of magnetic force to hold it in place as a heavy positionable object, and therefore can be mounted further away from the magnet 38. For example, cameras ranging in weight from about 4 ounces to about 15 pounds can be effectively positioned and supported by the magnetic mounting assembly shown in FIGS. 1 and 2. The greater magnetic force produced on the ball 41 when it is closer to the magnet 38 allows heavier objects to be secured and stably mounted by the present mounting assembly. As optional safety brake (not shown) on the adjusting collar 26 may be employed to easily lock and release the adjusting collar once it is in the correct axial position to prevent inadvertent axial movement of the adjusting collar 26 while the positioning element 24 is being moved to position the positionable object in the desired selected position. Brake structures suitable for this purpose are known, and an appropriate brake structure can be selected by one skilled in this art if it is desired to use this optional element.

The connector structure 28 located at pole a includes a plug 56, which may be threaded as shown in FIG. 2, to close the aperture 52 after the magnetically attractive material 46 has been placed in the ball 41. As described above a camera or other device is attached to the connector structure by the threaded shaft 30 or some other conventional means. The connector structure knob 31 is attached securely to the ball 41 so that the handle 32 can be used to move the ball 41 universally in the socket 40 to position and variably fix the camera or other device in a desired orientation. The movement of the handle 32 does not affect the movement of the adjusting collar 26 or the axial movement of the ball 41 relative to the socket 40 and magnet. 38.

Figure 4:
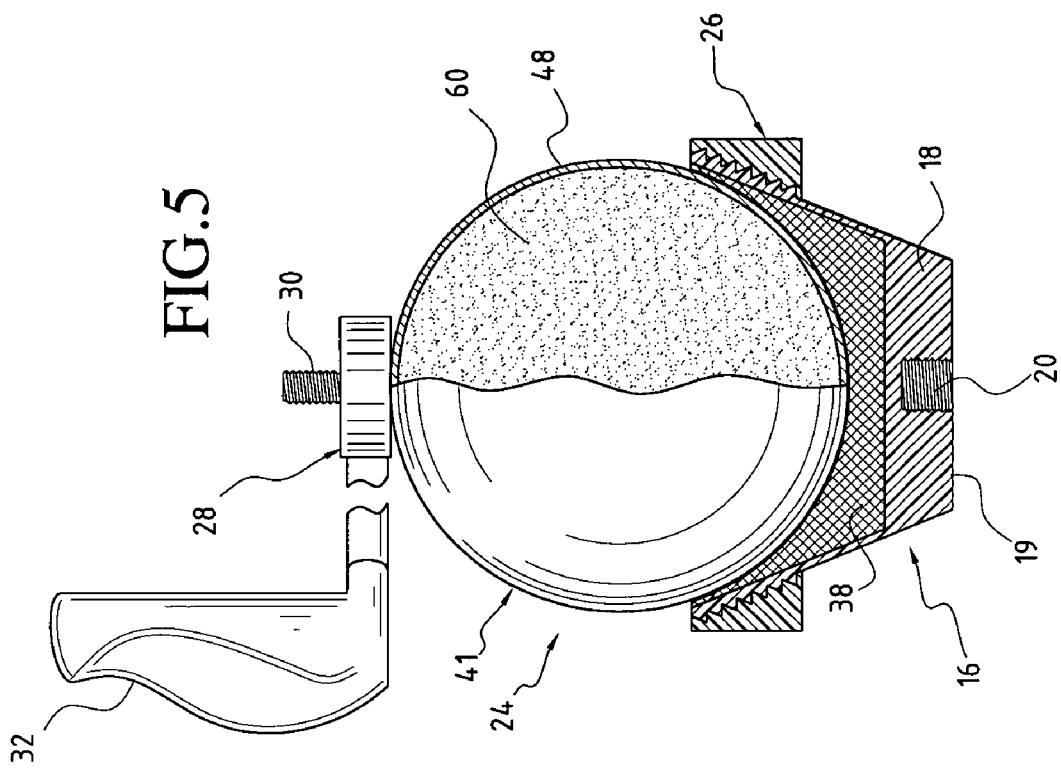
FIG. 4 is a partially cut away cross-sectional view of a second embodiment of a ball of the magnetic mounting assembly in accordance with the present invention.
Figure 5:
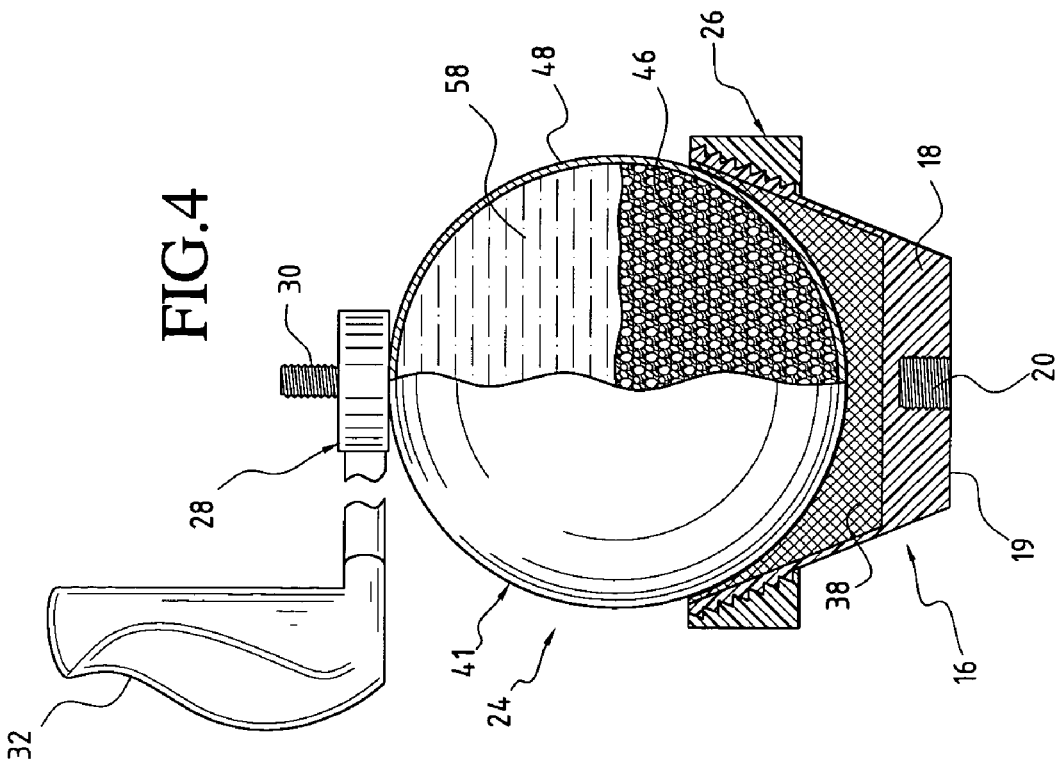
FIG. 5 is a partially cut away cross-sectional view of a third embodiment of a ball of the magnetic mounting assembly in accordance with the present invention.

FIGS. 4 and 5 illustrate two additional embodiments of the mounting assembly of the present invention. These embodiments relate specifically to the magnetically attractive materials used inside the ball 41 of the positioning element 24. In the embodiment shown in FIG. 4, the magnetically attractive particulate 46, which is preferably steel shot, occupies the optimal volume inside the ball 41 as discussed above, and the remaining volume is filled with a viscous hydraulic dampening fluid 58. The dampening fluid 58 cushions any vibrations and provides a quieter mounting assembly than that shown in FIG. 2 since the steel shot or other magnetically attractive particulate will not rattle. A preferred dampening fluid is a viscous oil, such as 30 to 90 weight gear oil, with a 90 weight oil being most preferred. Any other suitably viscous fluid could also be employed for this purpose.

The FIG. 5 embodiment uses a fluid or gel 60 in which very small magnetically attractive particles are suspended to fill the interior volume of the ball 41. The material effectively dampens vibrations and produces a mounting assembly characterized by especially smooth, quiet movement of the ball in the socket. A fluid containing magnetically attractive particles of the type available for use in automotive clutches is suitable for this purpose. When fluid is used inside the ball 41, as in the FIGS. 4 and 5 embodiments, a suitable seal or gasket (not shown) should be used in conjunction with the plug 56 to secure the connector assembly to the ball 41 to provide a fluid tight seal for the aperture 52 and prevent fluid leakage from the ball.

FIG. 6 illustrates another embodiment of the support element 16 of the mounting assembly of the present invention. In this embodiment the mounting base 70 is formed with a socket 72 that corresponds to the radius of curvature of the ball of the positioning element (not shown). A magnet 74 is located within the mounting base 70 to extend across the diameter of the socket 72. As in the other embodiment, a receptacle 76 is provided in the support contacting surface 78 to receive a connector (not shown) from the support on which the mounting base is to be supported. The arrangement shown in FIG. 6 may require a stronger magnet than the embodiment shown in FIGS. 3 to 5 since the ball containing the magnetically attractive material does not directly contact the magnet.

It is contemplated that the mounting assembly of the present invention could be configured to have a positioning element with a ball that includes a magnet and a support element with a mounting base that is magnetically attractive instead of the magnetic support element and magnetically attractive positioning element described above. In this case, the magnets 38 (FIG. 3) and 74 (FIG. 6) would be replaced with similarly shaped structures made of a magnetically attractive material, such as, for example, steel or iron. The ball would preferably be formed of a nonmagnetic material, such as, for example, a suitable plastic that would incorporate a magnetic material only in the socket-contacting hemisphere. To produce a ball with a magnetic socket-contacting hemisphere, magnetic material could be coated on the exterior or the interior surface of this hemisphere of the ball, or a hemispherically shaped magnet could be embedded in the plastic or other material forming the ball. Other methods of producing a ball with a magnetic socket-contacting hemisphere that minimize excessive magnetization of the positionable object-supporting hemisphere could also be used. This embodiment of the present mounting assembly could then be used with magnetically sensitive devices, for example, digital cameras. Minimizing the magnetization of the positionable object-supporting hemisphere of the ball portion of the positioning element will also avoid the attraction of metal detritus to the ball surface. Such detritus could interfere with the smooth operation of the positioning element.

Figure 7:
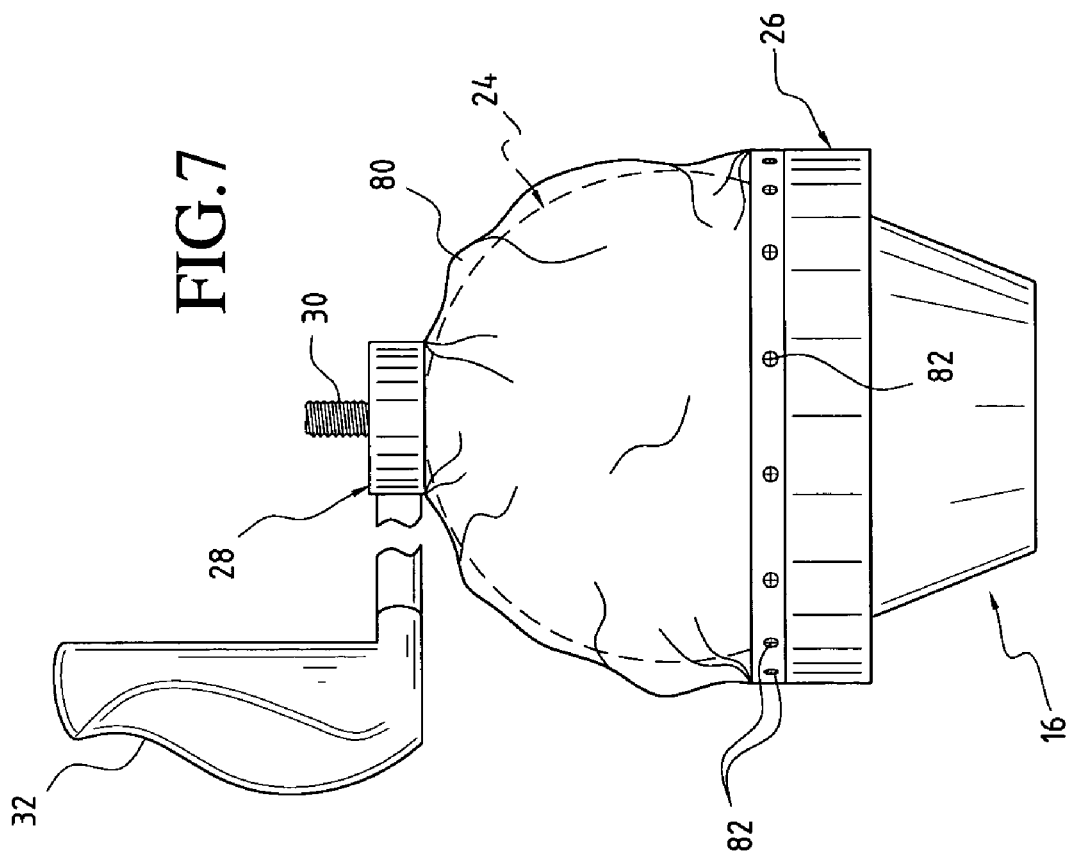
FIG. 7 is a side view of the magnetic mounting assembly of the present invention including a protective gaiter.

FIG. 7 shows a mounting assembly according to the present invention fitted with a protective cover or gaiter 80 that may be made of leather, rubber or a suitable synthetic material. The gaiter 80 is shaped to fit over the positioning element 24 so that the positioning element 24 can be freely moved by the handle 32 on the connector structure 28. The gaiter 80 is preferably attached to the circumference of the adjusting collar 26 as shown by fasteners 82. Any suitable fastener, including snaps and the like, that will permit the removal and reattachment of the gaiter 80 over the positioning element 26 can be used. While the gaiter is used primarily for aesthetic purposes, it also serves a protective function and keeps metal particles and other detritus away from the magnetic portions of the mounting assembly.

While the mounting assembly of the present invention has been described to support and position a camera or like device on a support such as tripod, it may be used to support and position a wide range of other positionable objects. The present magnetic ball and socket mount may be used as a mount for a rifle or other type of firearm. In addition, the mounting assembly of the present invention could be used to support and position optical instruments, including telescopes and the like, and also to support and position surveillance cameras. Industrial applications using a large version of the present mounting assembly to support and position positionable objects in industrial processes conducted at temperatures and pressures significantly above or below ambient temperature are additionally contemplated. The magnetic ball and socket connector described in connection with the present mounting assembly could further be used as a joint connector in overhead light assemblies such as those commonly used in dental and medical applications or in joint assemblies for robotic and surgical applications.

INDUSTRIAL APPLICABILITY

The magnetic mounting assembly of the present invention will find its primary application in mounting and positioning many different types and sizes of positionable objects on supports so that these positionable objects may be universally positioned and held in the desired position during operation. The magnetic ball and socket mounting assembly of the present invention may also be effectively employed in other applications in which it is desired to securely attach and universally vary the position of any apparatus that is required to be variably fixed in a selected position during operation thereof.

I claim:

1. A mounting assembly capable of securely and stably attaching a positionable object to be variably fixed in a desired selected position by frictional and magnetic forces to a support, wherein said mounting assembly comprises:
   (a) a positioning element attached to said positionable object including ball means for universally varying the position of said positionable object; and
   (b) a support element in supporting contact with said support including socket means configured to receive said ball means for securely contacting and holding said ball means so that the positionable object is fixed in said desired position; wherein one of said ball means or said socket means includes a magnetic material and the other of said ball means or said socket means includes a nonmagnetic, magnetically attractive material, said magnetic material and said magnetically attractive material being selected to achieve an optimum balance between the frictional and magnetic forces required to hold said positionable object in said desired selected position; wherein said socket means includes cup means configured to receive and movably hold said ball means, and said cup means includes a magnetic material, and said ball means comprises a hollow ball formed of a nonmagnetic material containing an optimally selected quantity of a magnetically attractive material.

2. The mounting assembly described in claim 1, wherein said cup means is formed from a magnetic material and is configured to directly movably contact said ball means.

3. The mounting assembly described in claim 1, wherein said socket means includes magnetic material positioned relative to said cup means so that said magnetic material does not directly contact said ball means.

4. The mounting assembly described in claim 1, wherein said hollow ball has a wall thickness selected to be proportional to the strength of the magnetic material in said cup means.

5. The mounting assembly described in claim 4, wherein said hollow ball has a wall thickness in the range of 0.005 to 0.012 inches.

6. The mounting assembly described in claim 1, wherein said magnetically attractive material comprises a magnetically attractive particulate.

7. The mounting assembly described in claim 6, wherein said magnetically attractive particulate comprises steel shot or iron particles having a diameter of about ⅛ to ½ inches.

8. The mounting assembly described in claim 6, wherein said magnetically attractive particulate and a hydraulic damping fluid are contained within said hollow ball.

9. The mounting assembly described in claim 6, wherein said magnetically attractive material is selected to avoid magnetization of the portion of the ball means not received and held by the socket means.

10. The mounting assembly described in claim 1, wherein said magnetically attractive material comprises a magnetically attractive fluid.

11. The mounting assembly described in claim 1, wherein said magnetic material is selected from the group consisting of permanent magnets, electromagnets, and combinations of permanent magnets and electromagnets.

12. The mounting assembly described in claim 3, wherein said magnetic material comprises a single magnet or multiple magnets.

13. The mounting assembly described in claim 1, wherein said support is a tripod and said support element includes a first connector means for removably securing said support element to said tripod; wherein said positionable object is a camera and said positioning element includes a second connector means for removably attaching the camera to said positioning element; and wherein said mounting means includes handle means for moving the positioning element to locate the camera in said desired selected position.

14. A mounting assembly capable of securely and stably attaching a camera to be variably fixed in a desired position selected from an infinite range of universally available positions by frictional and magnetic forces to a support, wherein said mounting assembly comprises:

(a) a positioning element comprising ball means attached to said camera and configured for universally moving the camera to a selected desired position, wherein said ball means comprises a hollow ball made of a nonmagnetic material containing within a magnetically attractive material;

(b) a support element including at one end thereof socket means configured to receive said ball means and for securely contacting and holding said ball means to variably fix said camera in said selected desired position, said support element further including in the end opposite said socket means attachment means for securing said support element to said support, wherein said socket means is formed of a magnetic material selected to achieve an optimum balance between the frictional and magnetic forces required to hold said camera in said selected desired position;

(c) adjustment collar means positioned in exterior contact with said ball means and in engaging contact with said socket means for adjustably moving said ball means axially into and out of contact with said socket means; and (d) camera attachment and positioning means on said positioning element for attaching said ball means to said camera and for controlling the universal movement of said ball means in said socket means to move the camera to said desired selected position and variably fix the camera in said position.

15. The mounting assembly described in claim 14, wherein said ball means is made of stainless steel or plastic, said magnetically attractive material is selected from the group consisting of steel particles, iron particles and magnetically attractive fluid; said support element and said adjustment collar means are made of a hard plastic material; and said camera attachment and positioning means further includes handle means to facilitate the positioning of the ball means.

* * * * *